United States Patent
Siedelhofer et al.

(10) Patent No.: US 10,271,369 B2
(45) Date of Patent: *Apr. 23, 2019

(54) SYSTEM AND METHOD FOR REATTACHMENT TO A NETWORK

(71) Applicant: Verizon Patent and Licensing Inc., Arlington, VA (US)

(72) Inventors: Paul H. Siedelhofer, Robbinsville, NJ (US); Abdul Subhan, Wayne, NJ (US); Gregory L. Miceli, Asbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,998

(22) Filed: Mar. 6, 2018

(65) Prior Publication Data
US 2018/0324887 A1 Nov. 8, 2018

Related U.S. Application Data

(63) Continuation of application No. 15/587,967, filed on May 5, 2017, now Pat. No. 9,942,937.

(51) Int. Cl.
*H04W 76/19* (2018.01)
*H04W 12/06* (2009.01)
*H04W 48/18* (2009.01)
*H04W 8/24* (2009.01)
*H04W 8/18* (2009.01)
*H04W 8/26* (2009.01)

(52) U.S. Cl.
CPC .......... *H04W 76/19* (2018.02); *H04W 8/24* (2013.01); *H04W 12/06* (2013.01); *H04W 48/18* (2013.01); *H04W 8/18* (2013.01); *H04W 8/26* (2013.01)

(58) Field of Classification Search
CPC .................................... H04W 76/028
USPC ..................................... 455/435.1
See application file for complete search history.

(56) References Cited

U.S. PATENT DOCUMENTS

2007/0169171 A1  7/2007  Kumar et al.
2008/0232376 A1* 9/2008  Huang ............... H04L 12/14
                                                      370/395.3

* cited by examiner

*Primary Examiner* — Joel Ajayi

(57) ABSTRACT

A method, a device, and a non-transitory storage medium provide storing context information pertaining to an end device and previous attachments of the end device to the network; receiving an indication that the end device requests an attachment to the network subsequent to the storing and subsequent to previously occurring detachments of the end device; authenticating the end device using the context information during the attachment; and causing a creation of a bearer connection between the end device and the network using the context information and during the attachment.

20 Claims, 17 Drawing Sheets

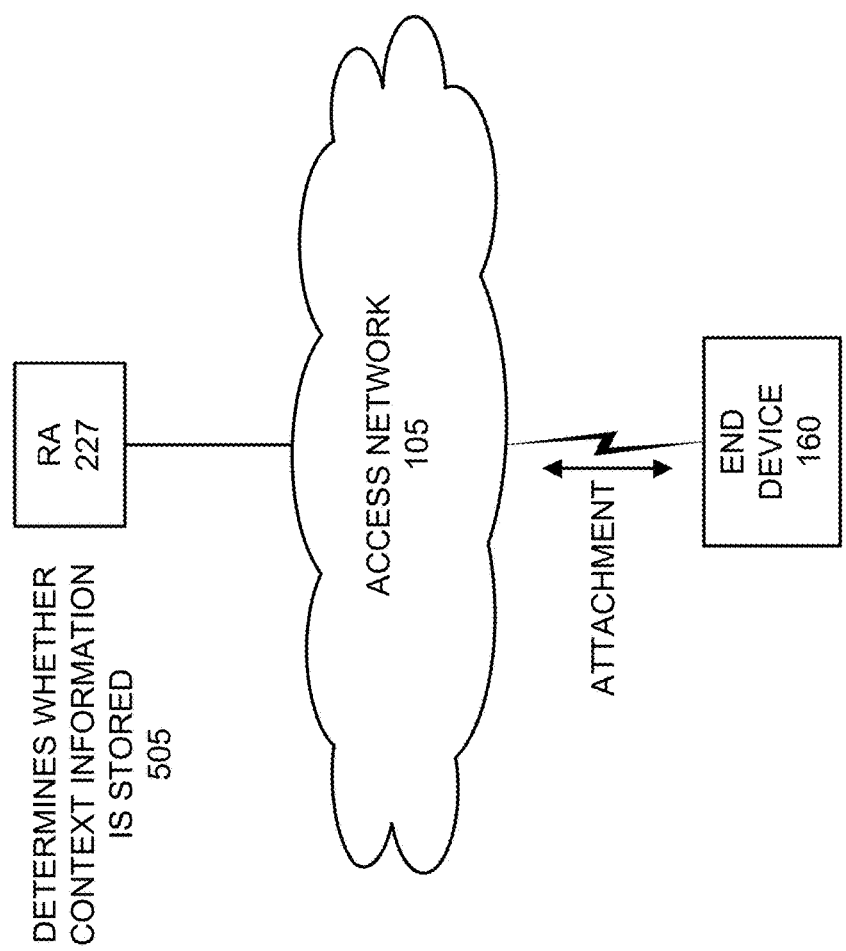

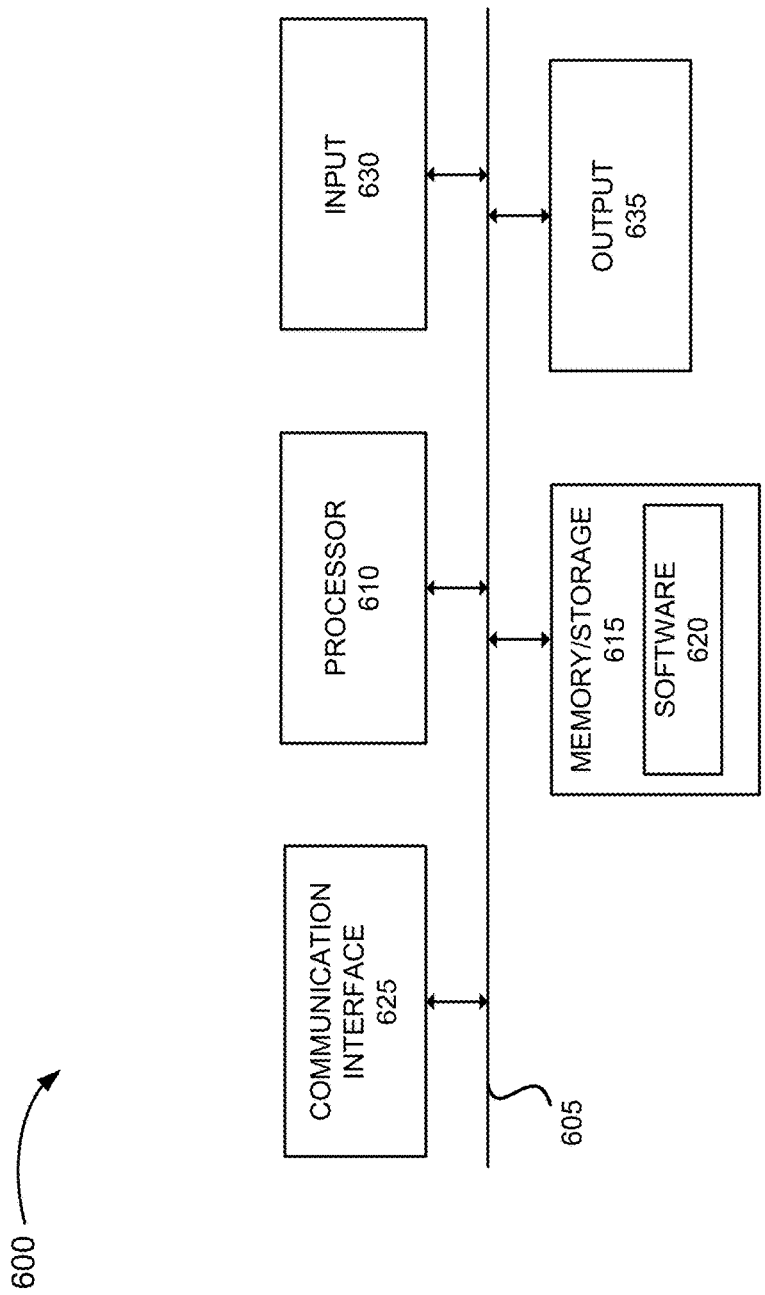

SYSTEM AND METHOD FOR REATTACHMENT TO A NETWORK

REFERENCE TO RELATED APPLICATION

This patent application is a continuation of U.S. patent application Ser. No. 15/587,967, entitled "SYSTEM AND METHOD FOR REATTACHMENT TO A NETWORK" and filed on May 5, 2017, which is hereby incorporated herein by reference in its entirety.

BACKGROUND

During an attachment procedure with a network, an end device may be authenticated and a connection may be established between the end device and the network. When the end device disconnects and wants to reconnect at a later time, an attachment procedure is performed again. The attachment procedure can include various signaling between the end device and the network to establish a connection thereby utilizing a substantial amount of signaling and potentially negatively impacting the usage of network resources and service quality from an end device perspective.

BRIEF DESCRIPTION OF THE DRAWINGS

FIGS. 5A-5D are diagrams illustrating another exemplary process of the reconnection service;

FIG. 6 is a diagram illustrating exemplary components of a device that may correspond to one or more of the devices illustrated herein;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An attachment procedure can involve a substantial amount of signaling. Therefore, the manner at which reattachments are executed can negatively impact the usage of network resources and service quality from an end device perspective.

According to exemplary embodiments, a service that manages reattachments in a wireless environment is described. According to an exemplary embodiment, the service provides reattachment procedures based on historical attachment data of an end device. For example, the historical attachment data may indicate times and locations pertaining to previous attachments, network device identifiers that identify network devices involved in the attachment procedure, the types of connections established during the attachments, and other types of context data. According to exemplary embodiment, the service includes a reattachment component that stores and uses the historical attachment data during a reattachment procedure performed between the end device and the network. According to an exemplary embodiment, the reattachment component shares context data with other reattachment components. In this way, the reattachment procedure may reduce signaling and usage of network resources because signaling between network elements to obtain context data may be eliminated and operations performed in the network during an attachment may be minimized. Also, the reattachment procedure may reduce the time for end device attachment based on a reduction of Sha messaging.

Figure 1:
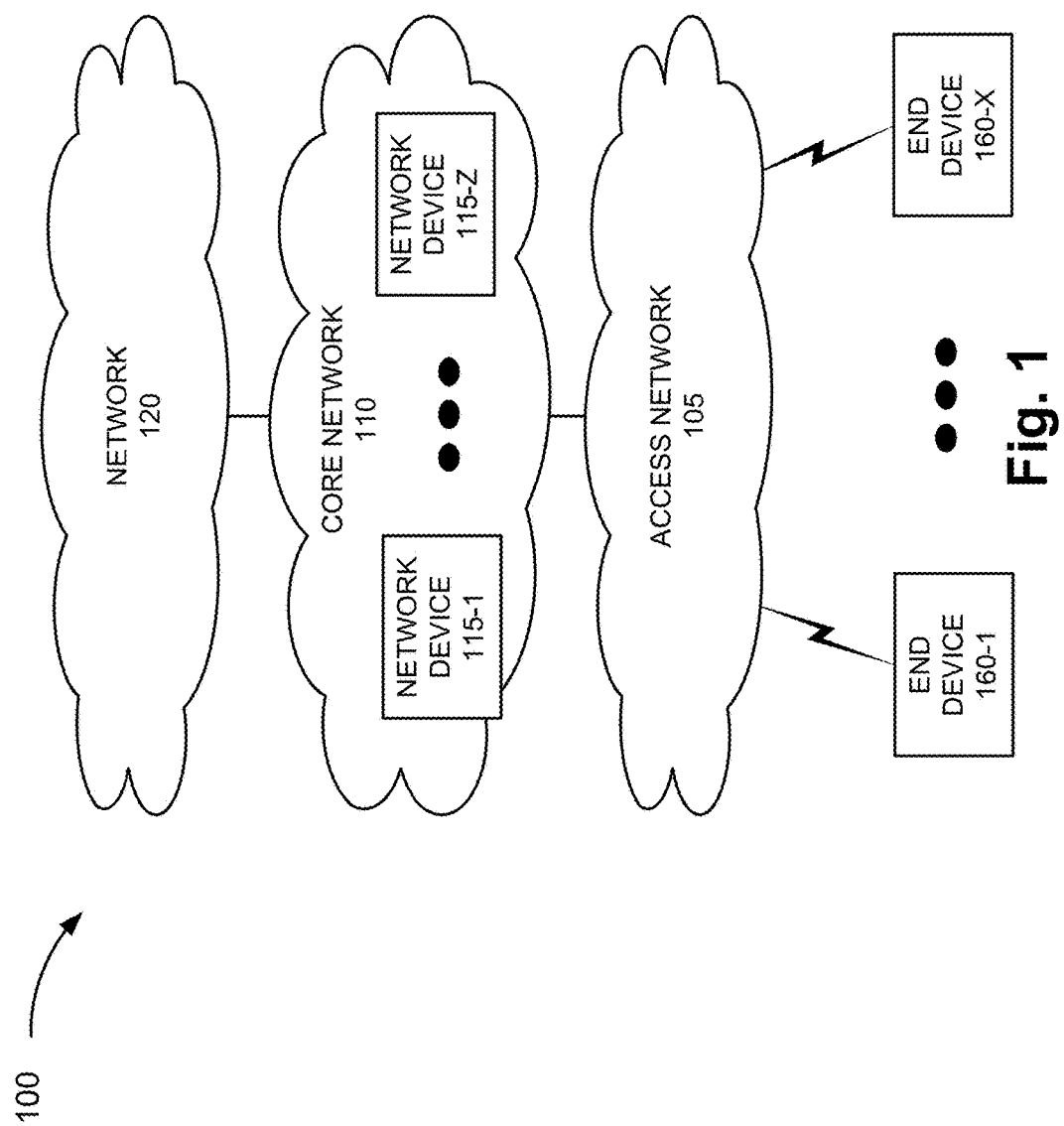
FIG. 1 is a diagram illustrating an exemplary environment in which an exemplary embodiment of a reconnection service may be implemented.

FIG. 1 is a diagram illustrating an exemplary environment 100 in which an exemplary embodiment of a reattachment service may be implemented. As illustrated, environment 100 includes an access network 105, a core network 110, and a network 120. Core network 110 includes network devices 115-1 through 115-Z (also referred to collectively as network devices 115 and, individually or generally as network device 115). Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device or an element may be implemented according to a centralized computing architecture, a distributed computing architecture, or a cloud computing architecture (e.g., an elastic cloud, a private cloud, a public cloud, etc.). Additionally, a device or an element may be implemented according to one or multiple network architectures (e.g., a client device, a server device, a peer device, a proxy device, and/or a cloud device).

Access network 105 includes one or multiple networks of one or multiple types. For example, access network 105 may be implemented to include a terrestrial network. According to an exemplary implementation, access network 105 includes a RAN. For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or an LTE-Advanced (LTE-A) network, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a local area network (LAN), a personal area network (PAN), or other type of network that provides access to or can be used as an on-ramp to core network 110. Depending on the implementation of access network 105, access network 105 may include various network devices, such as, for example, a base station (BS), a base transceiver station (BTS), a Node B, an evolved Node B (eNB), a remote radio head (RRH), an RRH and a baseband unit (BBU), a BBU, a wireless node (e.g., a small cell node (e.g., a picocell node, a femtocell node, a microcell node, etc.)), or other type of wireless station that provides wireless access to access network 105.

Core network 110 includes one or multiple networks of one or multiple types. For example, core network 110 may be implemented to include a terrestrial network. According to an exemplary implementation, core network 110 includes a complementary network pertaining to the one or multiple RANs described. For example, core network 110 may include the core part of an LTE network, an LTE-Advanced network, a CDMA network, a GSM network, and so forth. Depending on the implementation of core network 110, core network 110 may include various network devices 115, such as, for example, a gateway device, a support node, a serving node, a mobility management entity (MME), as well other network devices that provide various network-related functions and/or services, such as charging and billing, security, authentication and authorization, network policy enforcement, management of subscriber profiles, and/or other functions and/or services that facilitate the operation of core network 110.

According to an exemplary embodiment, network device 115 includes logic that provides the reattachment service, as described herein. According to an exemplary implementation, the network device 115 may be implemented as a part of a network device included in a standard of core network 110. By way of example, in the LTE network or the LTE-A network, network device 115 may be implemented as a part of an MME. According to other exemplary implementations, network device 115 may not be implemented as a part of a network device included in a standard of core network 110. For example, network device 115 may be implemented as a stand-alone network device and/or network element.

Network 120 includes one or multiple networks of one or multiple types. For example, network 120 may be implemented to provide an application and/or a service to end device 160. For example, network 120 may be implemented to include a service or application-layer network, the Internet, the World Wide Web, an Internet Protocol Multimedia Subsystem (IMS) network, a Rich Communication Service (RCS) network, a cloud network, a packet-switched network, a Public Switched Telephone Network (PSTN), a Signaling System No. 7 (SS7) network, a telephone network, a private network, a public network, a telecommunication network, an IP network, a wired network, a wireless network, or some combination thereof. Depending on the implementation of network 120, network 120 may include various network devices, such as, for example, a server (e.g., a Voice over Internet Protocol (VoIP) server, a streaming server, an end-user application server, a Session Initiation Protocol (SIP) server, an e-mail server, a web server, an application server, etc.), a Short Message Service Center (SMSC), a Multimedia Message Service Center (MMSC), a Call Session Control Function (CSCF), a gateway device, as well other network devices that provide various network-related functions and/or services, such as charging and billing, security, authentication and authorization, network policy enforcement, management of subscriber profiles, and/or other functions and/or services that facilitate the operation of network 120.

End device 160 includes a device that has computational and wireless communicative capabilities. End device 160 may be implemented as a mobile device, a portable device, or a stationary device. End device 160 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, or some other type of wireless end node. By way of further example, end device 160 may be implemented as a smartphone, a personal digital assistant, a tablet, a netbook, a phablet, a wearable device, a set top box, an infotainment system in a vehicle, a smart television, a game system, a music playing system, or some other type of wireless user device. According to various exemplary embodiments, end device 160 may be configured to execute various types of software (e.g., applications, programs, etc.). The number and the types of software may vary from one end device 160 to another end device 160.

Figure 2A:
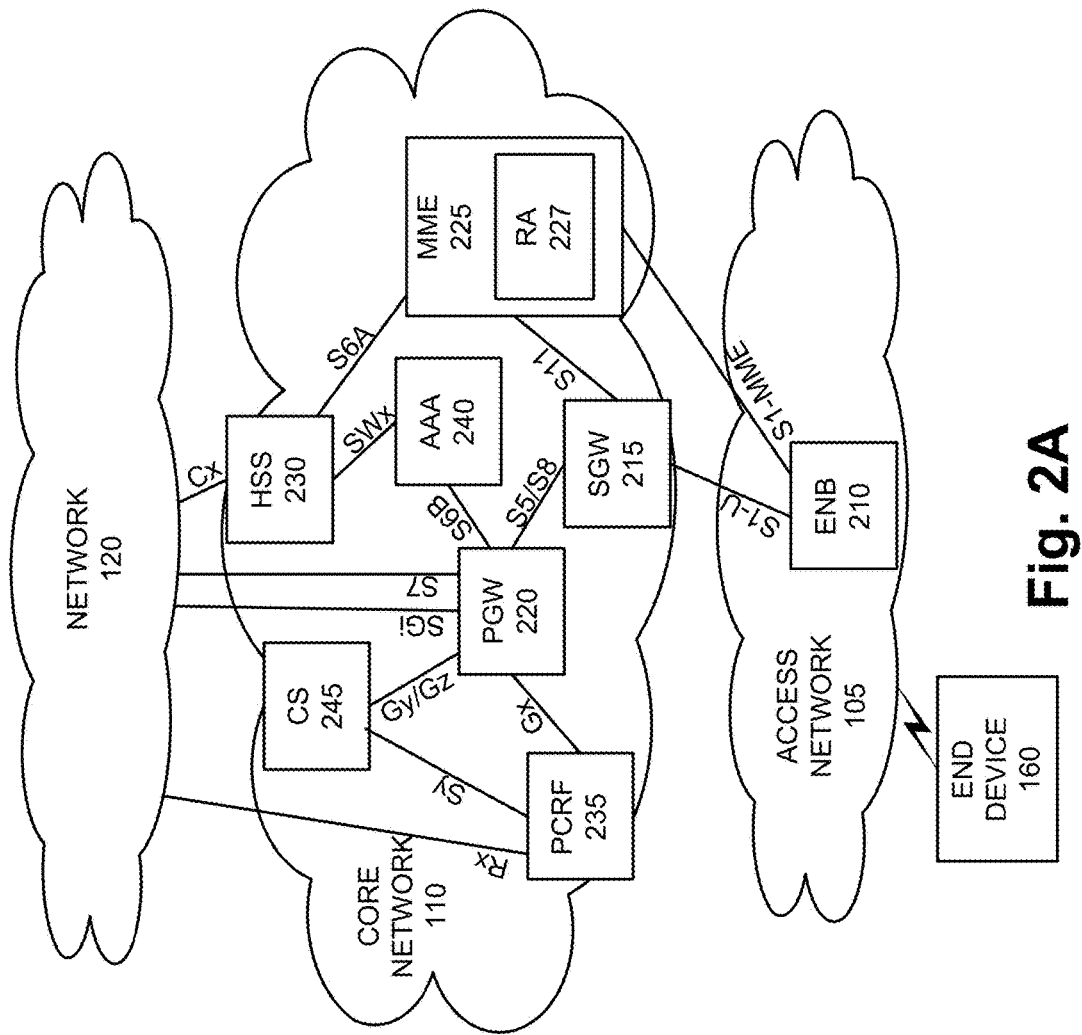
FIG. 2A is a diagram illustrating an exemplary implementation of the environment depicted in FIG. 1.

FIG. 2A is a diagram illustrating an exemplary implementation of environment 100 that provides the reconnection service, as described herein. According to this exemplary implementation, access network 105 may be implemented to include an E-UTRAN of an LTE network or an LTE-A network. As illustrated, access network 105 includes an eNB 210. Additionally, according to this exemplary implementation, core network 110 may be implemented to include an evolved packet core (EPC) of an LTE network or an LTE-A network. As illustrated, core network 110 includes a serving gateway (SGW) 215, a packet data network (PDN) gateway (PGW) 220, an MME 225, a home subscriber server (HSS) 230, a policy charging and rules function (PCRF) 235, an authentication, authorization, and accounting (AAA) server 240, and a charging system (CS) 245. As further illustrated, there are exemplary communication links and interfaces between the network elements. The number and arrangement of communication links illustrated in FIG. 2A are exemplary. Additionally, given the numerous protocols, standards, and proprietary frameworks that may be implemented, additionally and/or different interfaces may be used.

According to an exemplary embodiment, MME 225 includes a reconnection agent (RA) 227. Reconnection agent 227 includes logic that provides the reconnection service, as described herein. According to other exemplary embodiment, reconnection agent 227 may be implemented in a network device that is different from MME 225. For example, reconnection agent 227 may be implemented in PGW 220 or some other network device included in core network 110, an access network 105, or an intermediary network. Additionally, or alternatively, reconnection agent 227 may be implemented as a standalone network device or in a distributed fashion (among the same or different network devices, etc.).

eNB 210, SGW 215, PGW 220, MME 225, and PCRF 235 may each operate according to an LTE/LTE-A standard or architecture. In addition, eNB 210, SGW 215, PGW 220, MME 225, and/or PCRF 235 may include logic that provides the reconnection service, as described herein. The communication connections and interfaces used by eNB 210, SGW 215, PGW 220, MME 225, and PCRF 235 may each operate according to an LTE/LTE-A standard or architecture. In addition, the communication connections and/or interfaces used by eNB 210, SGW 215, PGW 220, MME 225, and/or PCRF 235 may communicate messages in support of the reconnection service, as described. Depending on the implementation, an interface may be modified to support the communication messages associated with the reconnection service, and/or a new interface may be implemented.

HSS 230 includes a network device that stores user subscription and user profile data. HSS 230 may also perform other services (e.g., authentication, authorization, etc.). According to an exemplary implementation, HSS 230 may include a Subscriber Profile Repository (SPR). AAA 240 includes a network device that provides authentication, authorization, and accounting services. CS 245 includes a network device that provides an off-line charging service and/or an on-line charging service. The charging service includes the generation of charging data records (CDRs) for a billing system or a billing domain.

Figure 2B:
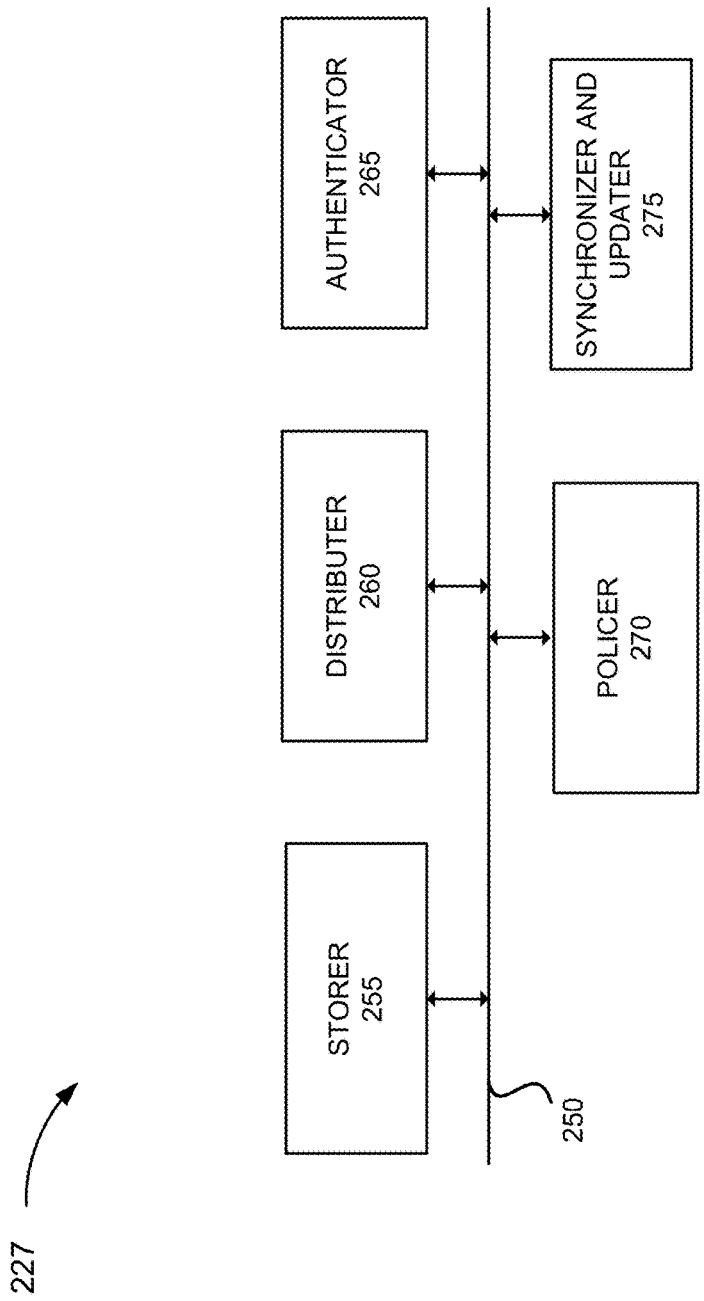
FIG. 2B is a diagram illustrating exemplary elements of a reconnection agent.

FIG. 2B is a diagram illustrating exemplary elements of an exemplary embodiment of reconnection agent 227. As illustrated, reconnection agent 227 includes a storer 255, a distributer 260, an authenticator 265, a policer 270, a synchronizer and updater 275, and a link 250. According to other exemplary embodiments, reconnection agent 227 may include additional, fewer, and/or different elements than those illustrated in FIG. 2B and described herein. Additionally, multiple elements may be combined into a single element. Additionally, or alternatively, a single element may be implemented as multiple elements in which a process or a function may be collaboratively performed or multiple processes or functions may be split between them. According to various embodiments, one or more of the elements may operate on various planes of an environment. For example, the various planes may include a data plane, a control plane, a management plane, and/or other planes implemented within the environment. According to an exemplary embodiment, include logic that supports the reconnection service, as described herein.

Figure 3:
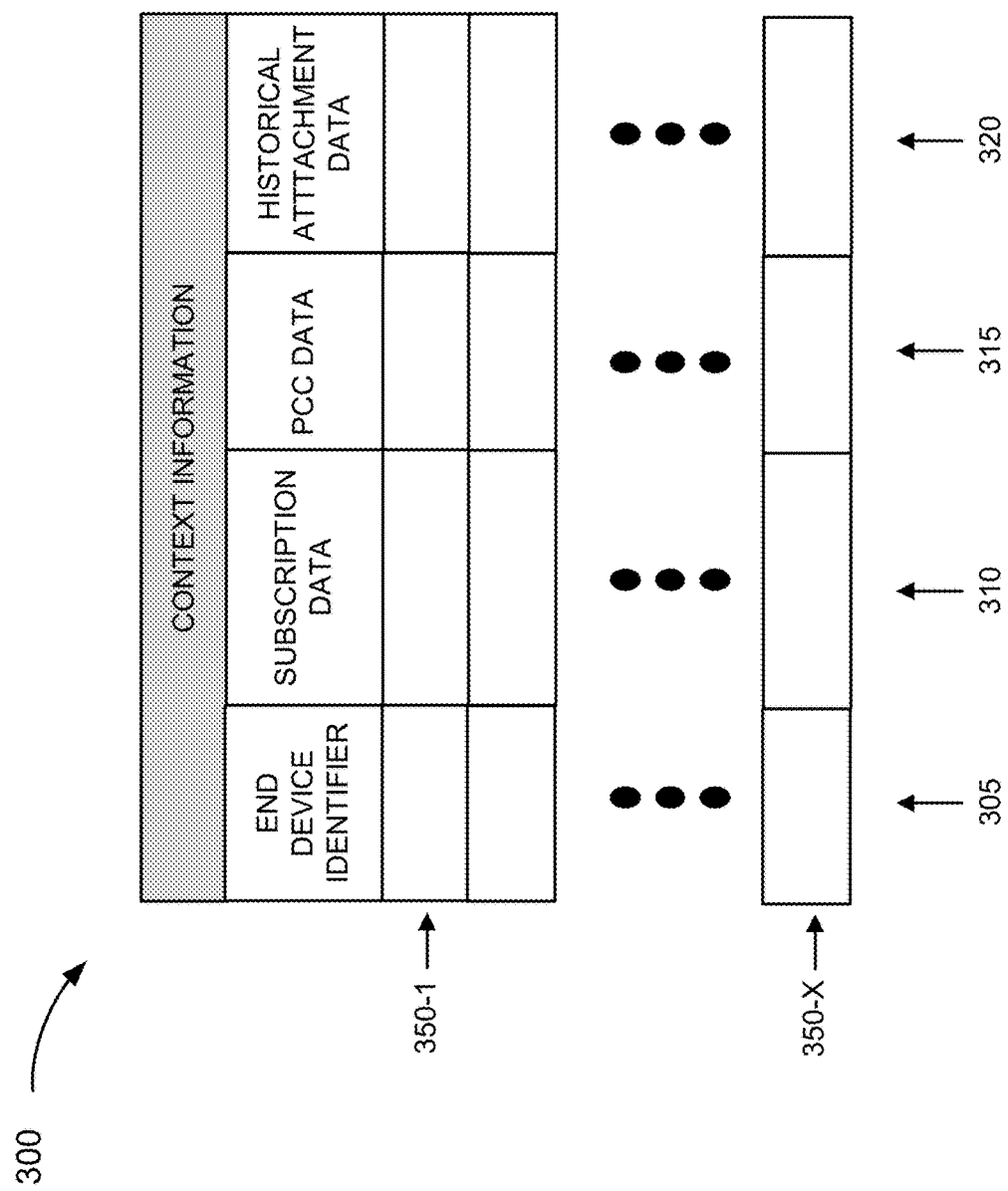
FIG. 3 is a diagram illustrating exemplary context information pertaining to an end device.

Storer 255 includes a storage device that stores context information. According to an exemplary implementation, the context information includes an end device identifier, subscription information, policy and charging control (PCC) information, and historical attachment data. For example, referring to FIG. 3, exemplary context information may be stored in a table 300 that includes an end device identifier field 305, a subscription data field 310, a PCC data field 315, and a historical attachment data field 320. As further illustrated, table 300 includes records 350-1 through 350-X that each includes a grouping of fields 305 through 320 that may be correlated. Context information is illustrated in tabular form merely for the sake of description. Context information may be implemented in a data structure different from a table.

End device field 305 stores data that indicates an identifier of end device 160. For example, end device field 305 may store a Globally Unique Temporary Identifier (GUTI), an International Mobile Subscriber Identity (IMSI), or other unique identifier that identifies a user of end device 160 or end device 160.

Subscription data field 310 stores data that indicates parameters and values pertaining to a network service of a user and/or end device 160. For example, subscription data field 310 may store data pertaining to an LTE/LTE-A service. By way of further example, the subscription data may indicate a subscribed access point name (APN), an identifier for a PGW through which the subscribed APN can be accessed, and a QoS profile. The QoS profile includes various QoS parameters and values. According to various exemplary implementations, the QoS profile may include QoS parameters and values pertaining to Non-Guaranteed Bit Rate (GBR) bearers, or Non-GBR bearers and GBR bearers. For example, the QoS profile may include a GBR and a Maximum Bit Rate (MBR) for GBR bearers, an Access Point Name-Aggregate Maximum Bit Rate (APN-AMBR) (uplink/downlink (UL/DL)) for Non-GBR bearers, a UE-AMBR (UL/DL) for Non-GBR bearers, a QoS Class Identifier (QCI) and an Allocation and Retention Policy (ARP) for GBR bearers and Non-GBR bearers.

PCC data field 315 stores policy and charging control data pertaining to Evolved Packet System (EPS) sessions. For example, the policy and charging control data may include QoS parameters and values (QoS control, QoS signaling, etc.), gating control, charging parameters and values (e.g., flow-based charging, charging control, online credit control, etc.), and trigger information (e.g., indicating activation/deactivation of a service (e.g., Internet, voice, etc.) or other event (e.g., a timer, a message from deep packet inspection (DPI), the SPR, etc.) pertaining to a subscriber and a flow.

Historical attachment data field 320 stores data indicating context data pertaining to previous attachments and corresponding detachments of end device 160. For example, the data may indicate a network-assigned network address (e.g., an Internet Protocol (IP) address, etc.) of end device 160, a date and time period of an attachment, and a network identifier (e.g., a globally unique identifier) that indicates a network device or a network element involved in the attachment (e.g., reattachment agent 227, MME 225, PGW 220, etc.), and location data (e.g., a cell identifier, a tracking area, etc.), and the network address (e.g., the IP address, etc.) of the network device or the network element. According to an exemplary implementation, HSS 230 may generate and store the historical attachment data. According to another exemplary implementation, another network device or network element may generate and store the historical attachment data.

Storer 255 may include a database management system (DBMS) or other data management system. Storer 255 includes logic that stores the context information, and may perform other storage-related functions, such as, deletes, updates, performs a search or a lookup, etc., pertaining to the context information.

According to other exemplary implementations, table 300 may store additional, fewer, and/or different instances of context information. For example, table 300 may store end device capability information. According to an exemplary implementation, the context information of end device 160 may be obtained by reconnection agent 227 during an attachment procedure. For example, in the LTE or LTE-A context, reattachment agent 227 may obtain the end device identifier from MME 225, the subscription data from HSS 230 or MME 225, policy and charging control data from HSS 230, PCRF 235, MME 225, or from PGW 220 via SGW 215, and the historical attachment data may be obtained from HSS 230, MME 225, or another other network device/element. Additionally, as described herein, reconnection agent 227 may obtain context information from another reconnection agent 227, from HSS 230 (e.g., during a synchronization process), and/or times other than during the attachment procedure. As an example, reconnection agent 227 may transmit a user location request to HSS 230, which upon receipt, HSS 230 may transmit a user location response that includes the context information.

Referring back to FIG. 2B, distributer 260 includes logic that transmits context information to and receives context information from other reconnection agents 227. Distributer 260 may transmit context information to another reconnection agent 227 based on the occurrence of various triggers.

Authenticator 265 includes logic that authenticates end device 160 based on the context information stored in storer 255. Policer 270 includes logic that logic that synchronizes and updates the context information with PCRF 235. Synchronizer and updater 275 includes logic that synchronizes and updates the context information with HSS 230.

Link 250 provides a communicative link between two or more elements. Link 250 may be implemented as a hardware link (e.g., a bus, a shared memory space, etc.), a software link (e.g., inter-process communication (IPC), etc.), a communication link between network devices, or some combination thereof.

Figure 4A:
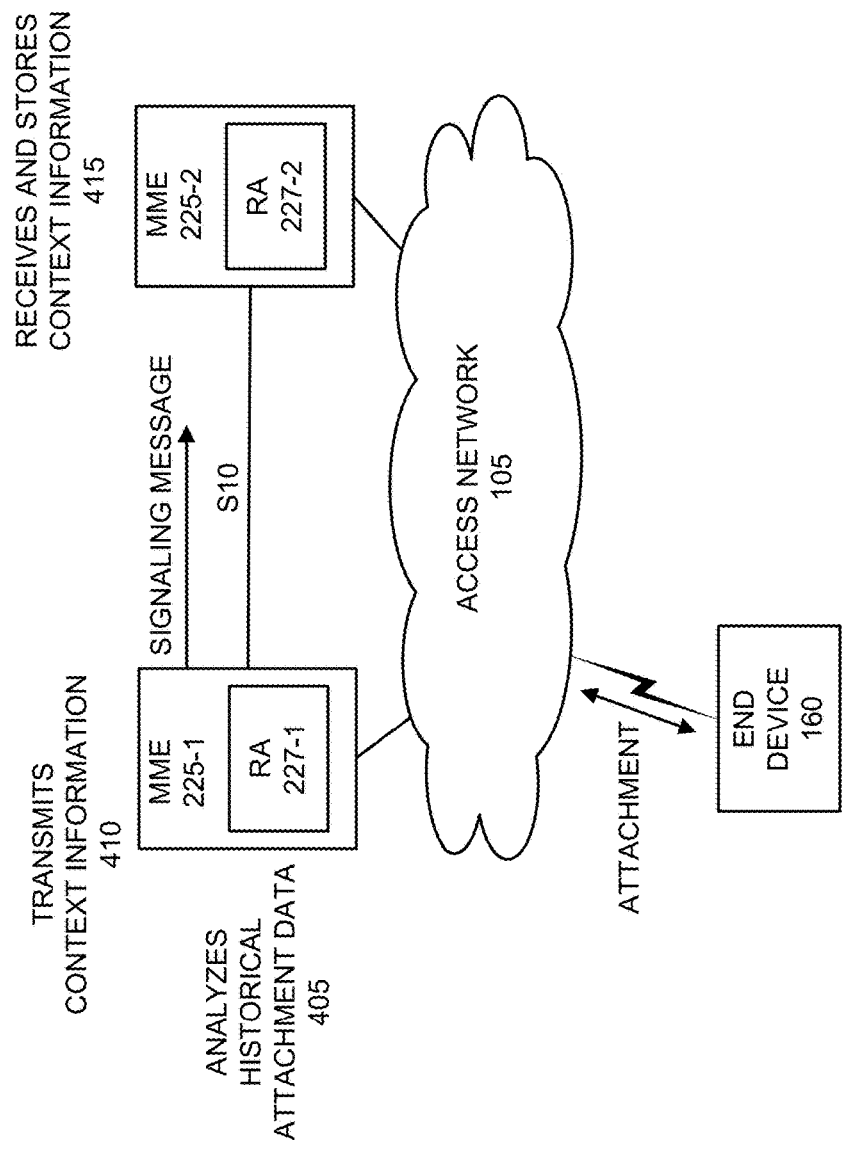
FIGS. 4A-4E are diagrams illustrating exemplary processes of the reconnection service.

According to exemplary embodiments, the reattachment service may be implemented when end device 160 attaches and reattaches to a network. According to an exemplary scenario, the reattachment service may be implemented to include when end device 160 moves from one MME 225 to another MME 225. For example, referring to FIG. 4A, during an attachment procedure, RA 227-1 may identify historical attachment data 405 stored in storer 255 pertaining to end device 160. Distributer 260 may analyze the historical attachment data, and determine whether context data should be distributed to another reattachment agent 227. For example, distributer 260 may identify whether another reattachment agent 227 and/or MME 225 will be involved in a subsequent reattachment within a certain time period from the time of the current attachment. The time period may be configurable parameter. According to this example, assume that the historical attachment data indicates that end device 160 will reattach to MME 225-2 within the time period. In response, distributer 260 transmits context information 410 via an S10 interface to MME 225-2/reconnection agent 227-2. For example, the context information may be transmitted as a signaling message. The signaling message may be a new message (e.g., not an LTE standard signaling message) or a modified LTE standard signaling message that carries the context information (e.g., a context request message or other inter-MME signaling message). As previously described, the historical attachment data may include an identifier and network address of the network device/network element. MME 225-2/reconnection agent 227-2 receives and stores the context information 415.

Figure 4B:
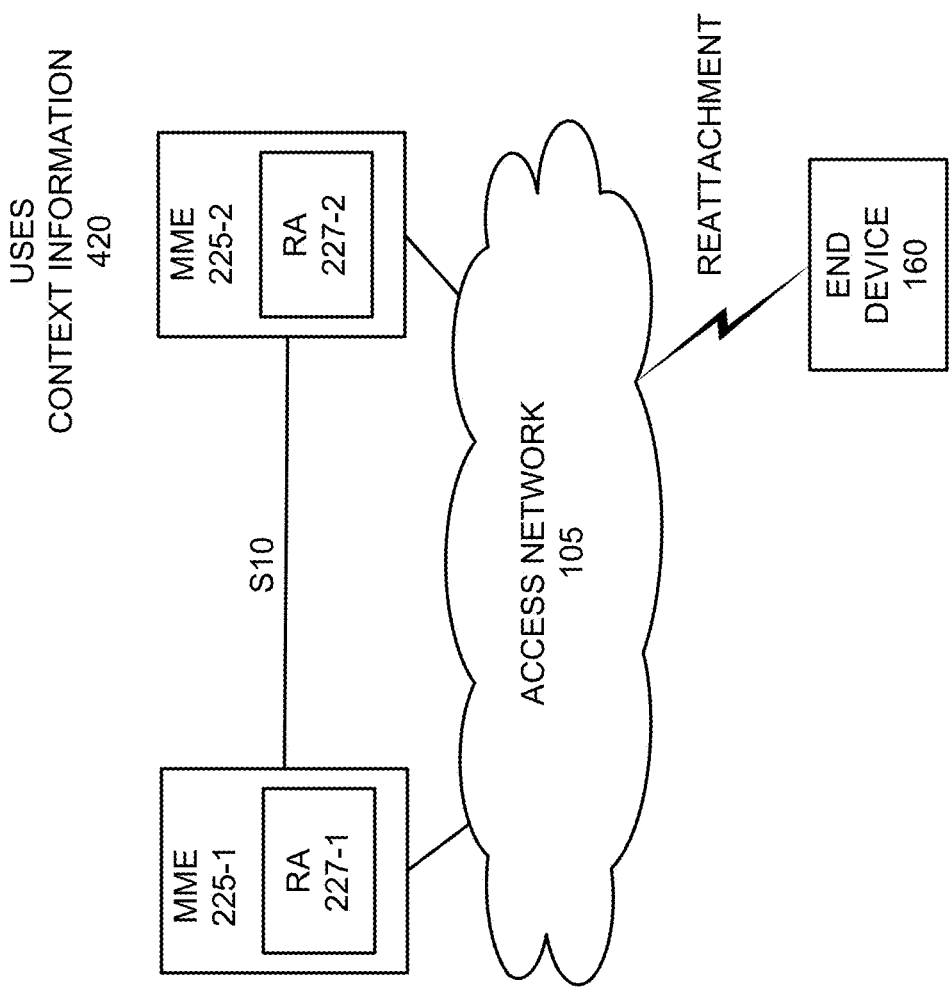

Referring to FIG. 4B, assume that end device 160 subsequently attaches to MME 225-2. However, unlike the attachment procedure that may have previously occurred, the attachment procedure with MME 225-2 may not include various signaling between network elements and/or operations performed by the network elements that may have occurred during a previous attachment. For example, according to an exemplary embodiment, authenticator 265 of reconnection agent 227-2 may authenticate end device 160 based on the end device identifier (e.g., GUTI) stored in the context information.

Figure 4C:
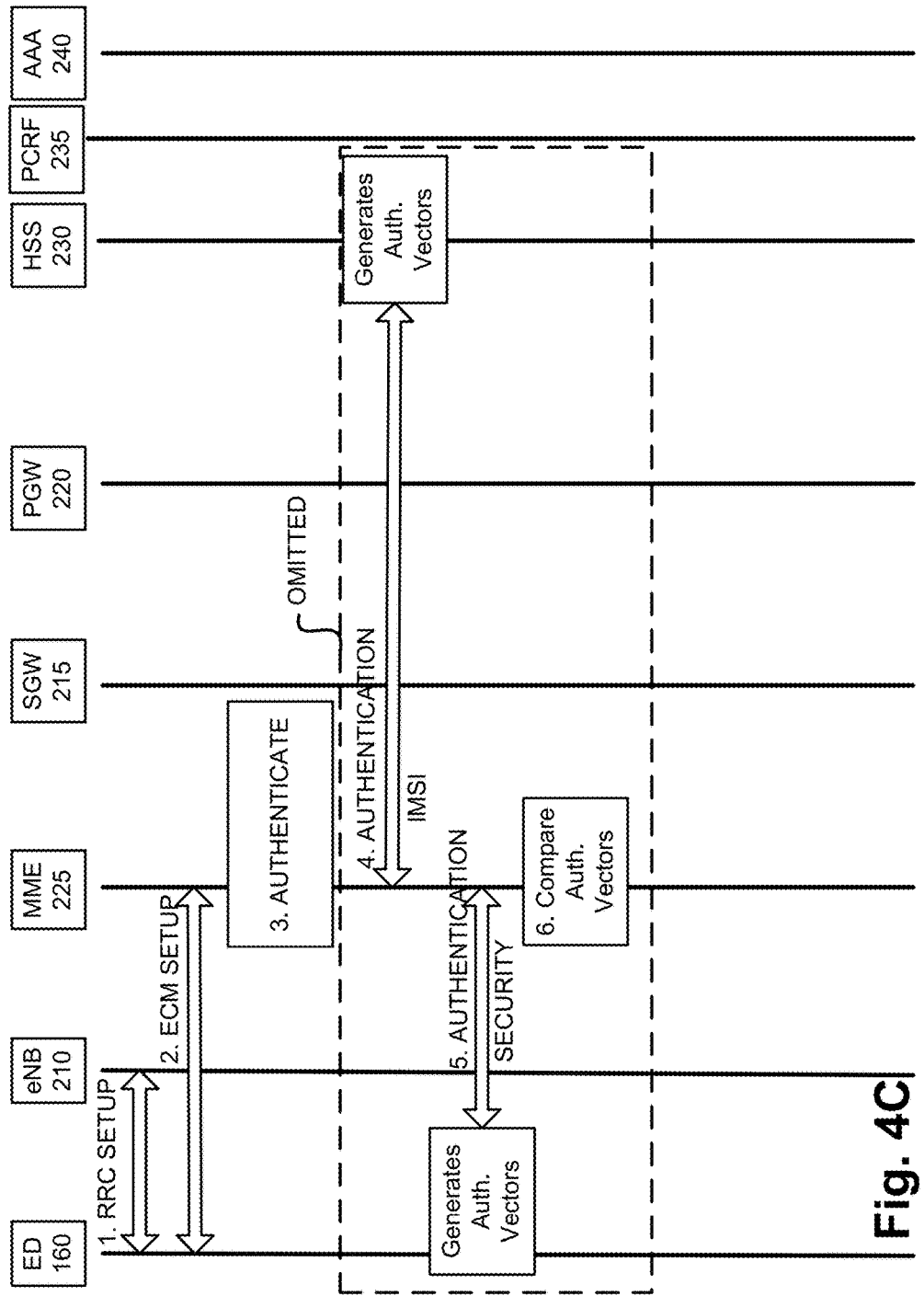

Referring to FIG. 4C, typically according to an LTE attachment procedure, in which a radio resource control (RRC) connection (1) and an EPS Connection Management (ECM) setup (2) are established, an authentication procedure (3) begins. For example, MME 225 acquires authentication vectors from HSS 230, which are generated by HSS 230, based on the IMSI of end device 160, as illustrated by message and operation four (4) (Authentication). In turn, MME 225 and end device 160 exchange messages, as further illustrated by message and operation five (5). For example, MME 225 transmits an Authentication Request to end device 160, which includes parameters (e.g., a random number, an authentication token, etc.). End device 160 uses the parameters to generate authentication vectors, and transmits the authentication vectors to MME 225. In operation six (6), MME 225 may compare the authentication vectors provided by HSS 230 with the authentication vectors provided by end device 160, to determine whether a match exists. However, according to an exemplary embodiment, the reattachment service may authenticate end device 160 according to a different procedure. For example, although not illustrated, according to an exemplary implementation, messages two (2) of the ECM setup includes end device 160 transmitting an attach request that includes the end device identifier. The end device identifier may be an IMSI of end device 160, or the GUTI previously assigned to end device 160. Authenticator 265 of reconnection agent 227-2 may invoke an authenticate process with end device 160 based on comparing the end device identifier obtained from end device 160 with the data stored in end device identifier field 305. For example, authenticator 265 may search for the GUTI or correlate the IMSI with the GUTI. When a match exists, as illustrated in operation three (3), authenticator 265 may authenticate end device 160.

Figure 4D:
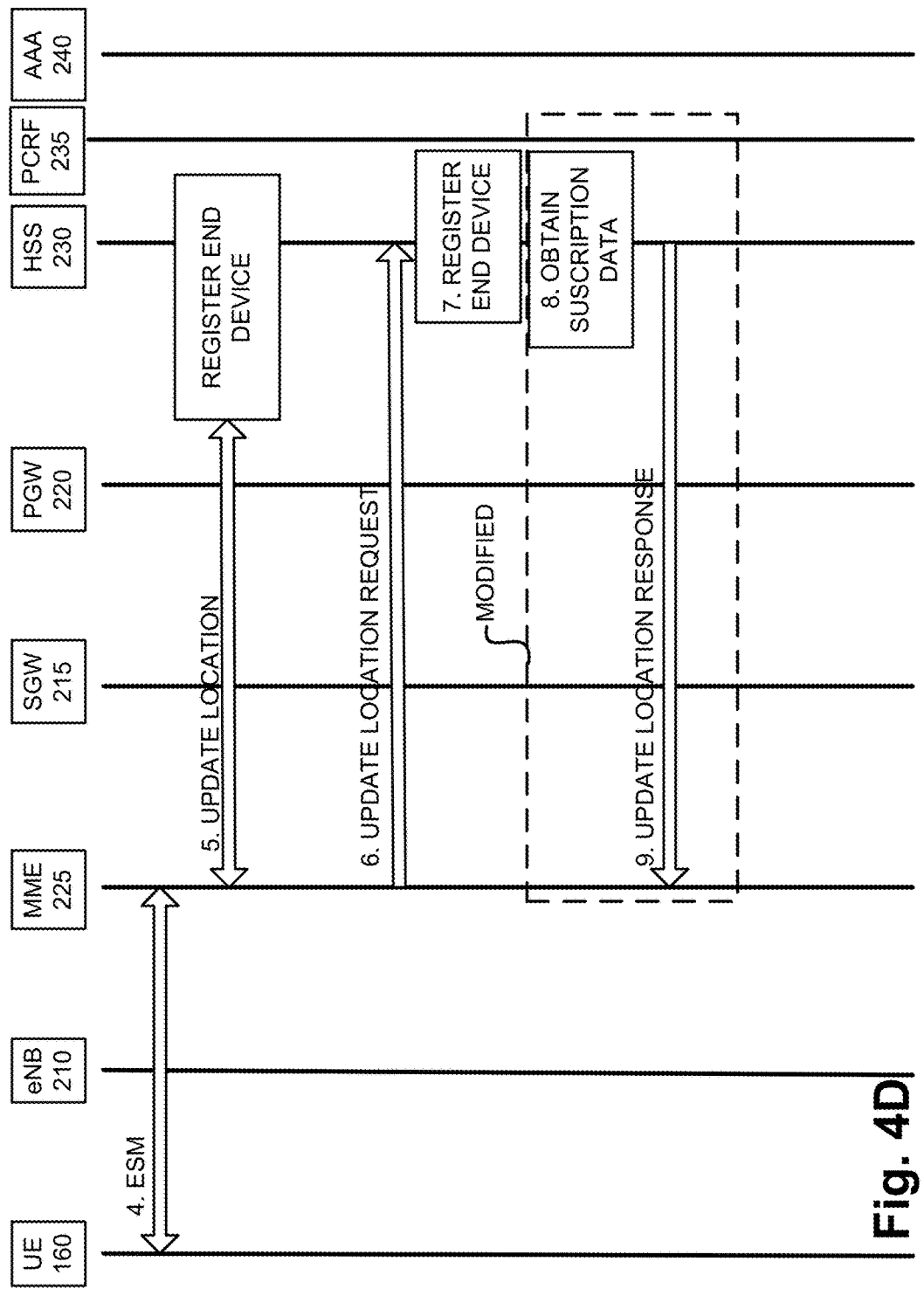

Referring to FIG. 4D, according to an exemplary embodiment, the reattachment service may perform an update location procedure different from an update location procedure that may be specified under a standard. For example, in messages five (5), a registration of end device 160 with the network may not include HSS 230 providing subscription data to MME 225-2/reconnection agent 227-2. Typically, referring to message six (6), MME 225 may transmit an update location request to HSS 230, and upon receipt, as illustrated as operation seven (7), HSS 230 may register end device 160. Thereafter, HSS 230 obtains the subscription data of end device 160 (e.g., based on the end device identifier), and transmits an update location answer, which carries the subscription data, to MME 225, as illustrated in operation eight (8) and message nine (9).

According to an exemplary embodiment of the reattachment service, HSS 230 may not perform operation eight (8) and transmit message nine (9). Alternatively, HSS 230 may transmit message nine (9) as an indication of acknowledgement that end device 160 has been registered. However, the update location response may not carry the subscription data. According to yet another exemplary implementation, the update location request/response messages may be used to synchronize and/or update the subscription data stored by reconnection agent 227-2 with HSS 230.

Figure 4E:
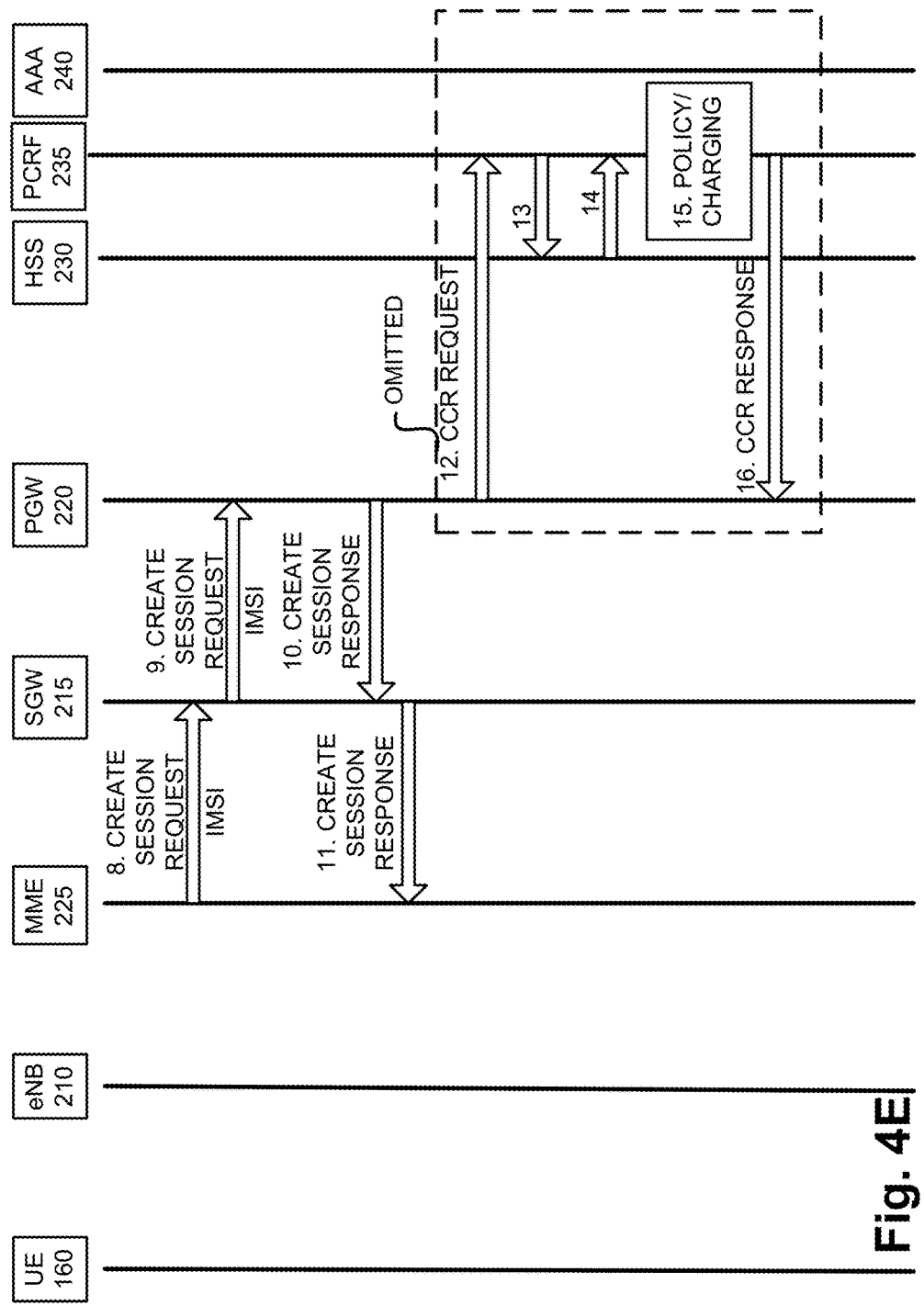

Referring to FIG. 4E, according to an exemplary embodiment, the reattachment service may perform an EPS session establishment procedure different from an EPS session establishment procedure that may be specified under a standard. For example, in messages eight (8), nine (9), ten (10), and eleven (11), the reattachment service may establish an EPS session and default EPS bearer without obtaining policy and control information from PCRF 235. Typically, in response to PGW 220 receiving a create session request, PGW 220 may transmit a request (e.g., a charging and control request (CCR)) to PCRF 235, as illustrated in message ten B (10B). In turn, PCRF 235 may obtain a user access profile pertaining to end device 160 from HSS (e.g., an SPR) via messages thirteen (13) and fourteen (14). The user access profile may include a session data flow (SDF)

filter, a QCI, an ARP, and other information previously described. In operation fifteen (15), PCRF 235 may make policy and charging decisions regarding the EPS session to be established. In response to making the decisions, PCRF 235 may transmit a response (e.g., a CCR response), which includes the policy and charging parameters, to PGW 220, as illustrated in message sixteen (16). In response to receiving the CCR response, although not illustrated, PGW 220 applies the policies/charging parameters, applies the QoS profile to the prospective default EPS bearer, and transmits a create session response to SGW 215, similar to that of the create session response of message 10.

According to an exemplary embodiment, the reattachment service may omit the operations and messages illustrated in 12 through 16 of FIG. 4E. For example, policer 270 of reconnection agent 227-2 may include the policy and charging information in messages 6 and 7. In this way, the messages and operations illustrated in steps 8B through 12 may be omitted. Additionally, for example, when PGW 220 receives the create session request from SGW 215, PGW 220 may determine whether to communicate with PCRF 235 based on whether the create session request includes the policy/charging parameters or not.

Although FIGS. 4A-4E illustrate exemplary processes of the reconnection service when end device 160 reattaches to an MME that is different from a previous MME, according to other exemplary embodiments, the reconnection service may be invoked in view of other exemplary scenarios. For example, when end device 160 performs a power cycle (e.g., powers off and powers on) in which, given the time period that has transpired, end device 160 may perform an attachment procedure. According to another exemplary scenario, the reconnection service may be invoked when end device 160 reattaches after a time-to-live expires for a traffic flow template (TFT) (e.g., an access point name (APN) TFT, an EPS bearer TFT, etc.). According to yet another exemplary scenario, the reconnection service may be invoked when a failure causes context information of end device 160 to be deleted in the network. As an example, during an upgrade process for MME 225, context information may be accidentally deleted. According to an exemplary implementation where reconnection agent 227 acts as a storage backup for context information that is also stored by MME 225, reconnection agent 227 may be used to restore the context information on MME 225. Additionally, or alternatively, reconnection agent 227 may store the context information of end device 160 for a longer period of time than other elements of a network. As an example, elements of a network (e.g., PGW 220, MME 225, etc.) may delete context information based on some triggering event (e.g., disconnection of end device 160 from the network, the expiration of a timer, etc.). However, reconnection agent 227 may continue to store the context information for a longer period of time.

According to the exemplary scenario described in relation to FIGS. 4A-4E, when end device 160 reattaches to the network, reconnection agent 227 stores the context information. However, this may not always be the case. For example, the historical attachment data may not indicate a future attachment where reconnection agent 227 is predicted to be involved. FIGS. 5A-5D are diagrams illustrating an exemplary process of the reconnection service in which the context information is not pre-stored at reconnection agent 227.

Figure 5B:
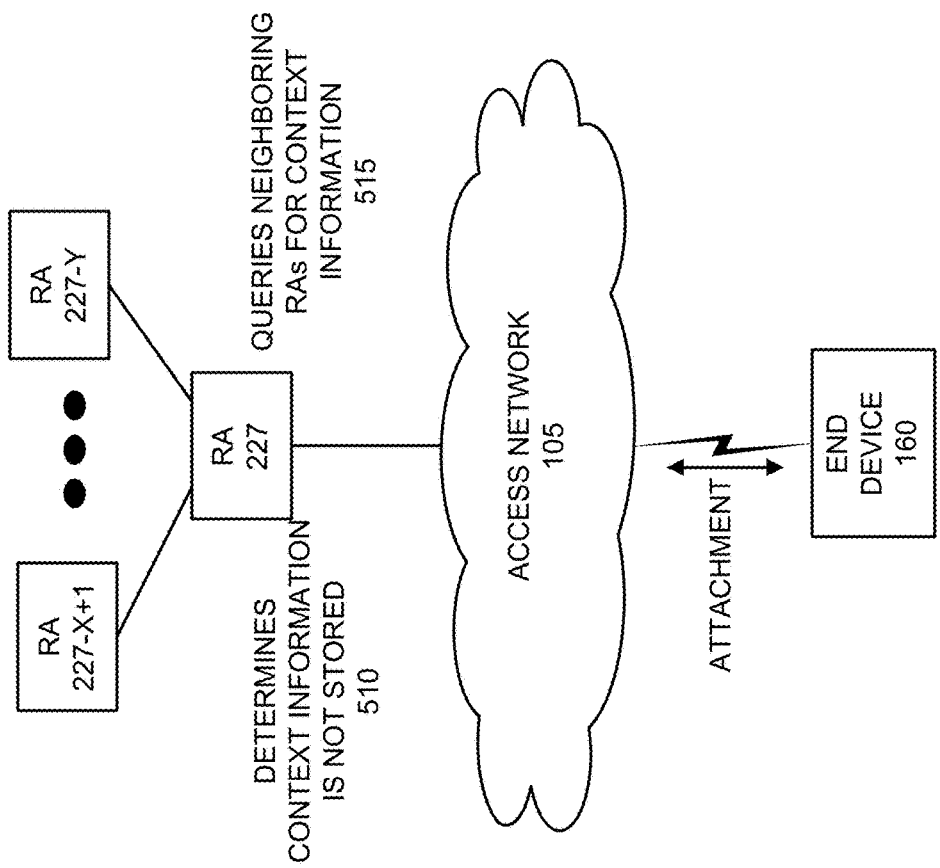

Referring to FIG. 5A, assume that an attachment procedure has been initiated, and an RRC connection and an ECM setup have been established. Authenticator 265 may determine whether context information is stored 505 in storer 255. For example, authenticator 265 may search for the GUTI or correlate the IMSI of end device 160 with the GUTI so as to obtain the context information (e.g., stored in table 300). Referring to FIG. 5B, according to this exemplary scenario, assume that authenticator 265 does not find the context information (e.g., the GUTI, etc.) pertaining to end device 160, and determines the context information is not stored 510 in storer 255. In response, synchronizer and updater 275 queries neighboring reconnection agents 227 for the context information 515. For example, synchronizer and updater 275 may store neighbor information (e.g., network identifiers of reconnection agents, network addresses of reconnection agents, etc.). Synchronizer and updater 275 may generate and transmit a query request message, which includes an end device identifier or an end device identifier and a GUTI of end device 160, to one or multiple reconnection agents 227 (e.g., reconnection agents 227-X+1 through 227-Y). Reconnection agents 227 may each perform a lookup based on the query request message to determine whether context information for end device 160 is stored in storer 255. Depending on the result of lookup, a queried reconnection agent 227 may generate and transmit a query response message that carries the context information of end device 160 or indicates that the context information was not found.

Figure 5C:
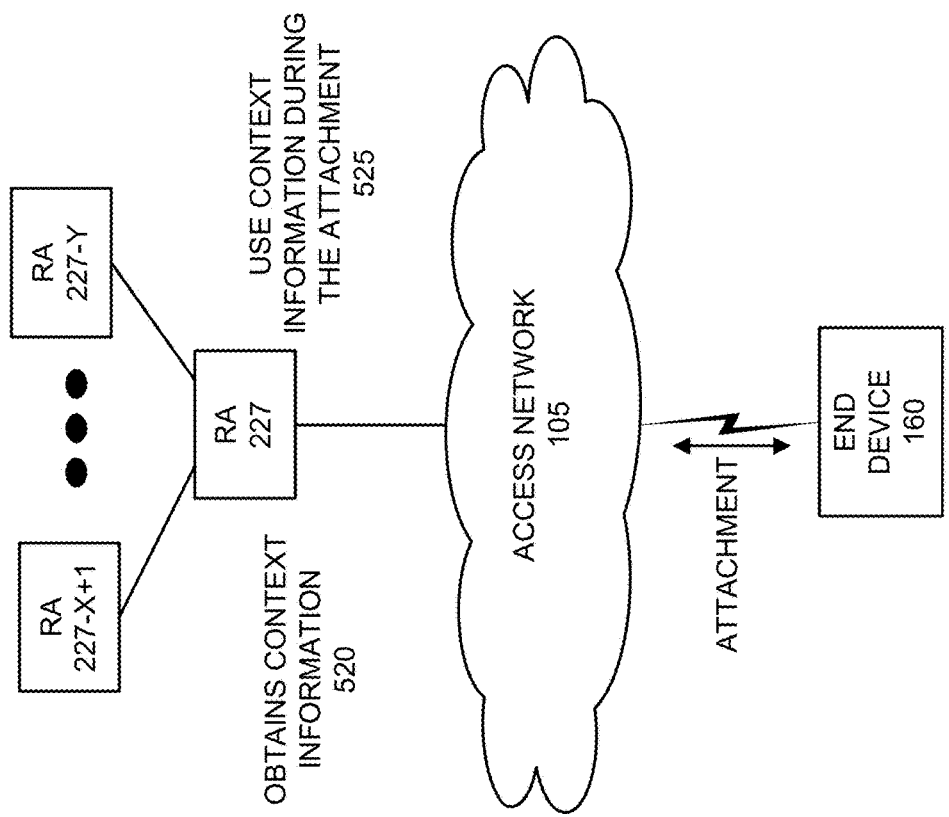

Referring to FIG. 5C, according to an exemplary scenario, when one of the queried reconnection agents 227 transmits the query response message that carries the context information, reconnection agent 227 may obtain the context information 520 from a neighboring reconnection agent 227. Thereafter, reconnection agent 227 may use the context information during the attachment procedure 525 according to the various embodiments described.

Figure 5D:
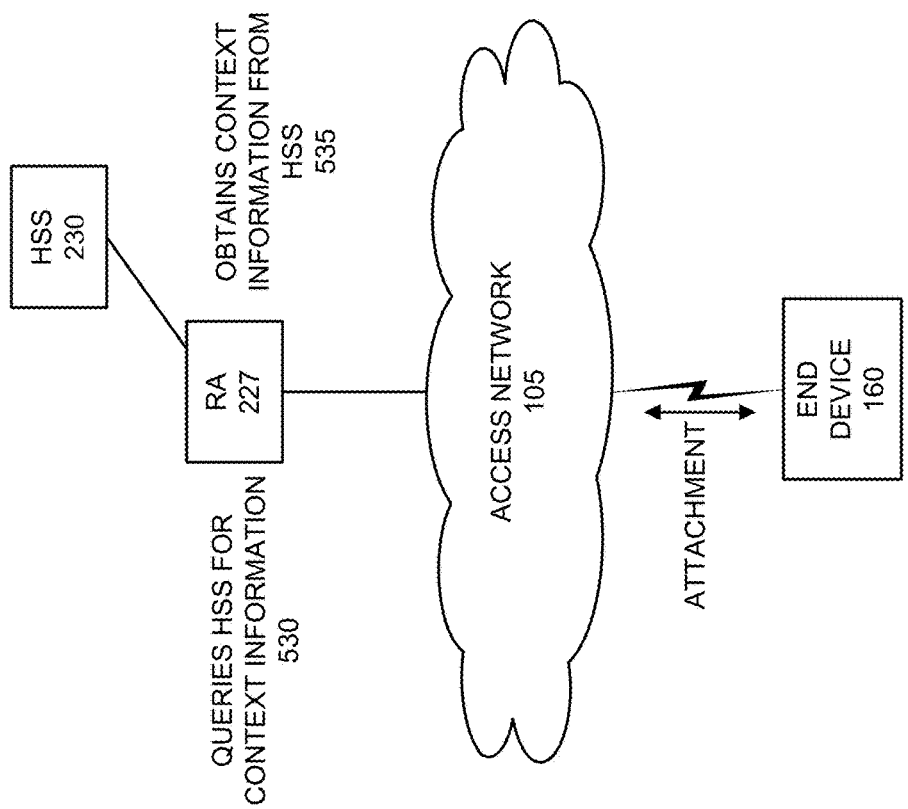

Referring to FIG. 5D, according to another exemplary scenario, when none of the queried reconnection agents 227 transmit the query response message that carries the context information, synchronizer and updater 275 may query HSS 230 for the context information 535. For example, synchronizer and updater 275 transmits a query request message, which includes the end device identifier and/or the GUTI of end device 160. In response, HSS 230 performs a lookup and determines whether the context information is stored. However, in the event that HSS 230 does not store the context information, reconnection agent 227 may perform the attachment procedure according to an LTE standard.

Additionally, according to an exemplary embodiment, reconnection agent 227 may transmit a request to synchronize context information with HSS 230. The synchronization process may be performed periodically, after the context information is deemed stale (e.g., based on timer or a time-to-live parameter value), or responsive to some other configurable event. Further, storer 255 may perform delete context information after a configurable time period of non-use has transpired.

FIG. 6 is a diagram illustrating exemplary components of a device 600 that may correspond to one or more of the devices described herein. For example, device 600 may correspond to components included in end device 160 and various network devices/elements. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 615 may include a hard disk (e.g., a magnetic disk, an optical disk, a magneto-optic disk, a solid state disk, etc.) and a corresponding drive. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to reconnection agent 227, software 620 may include an application that, when executed by processor 610, provides the functions of the reconnection service, as described herein. Similarly, other network devices/elements may include an application that, when executed by processor 610, provides the functions of the reconnection service, as described herein. Software 620 may also include firmware, middleware, microcode, hardware description language (HDL), and/or other form of instruction.

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
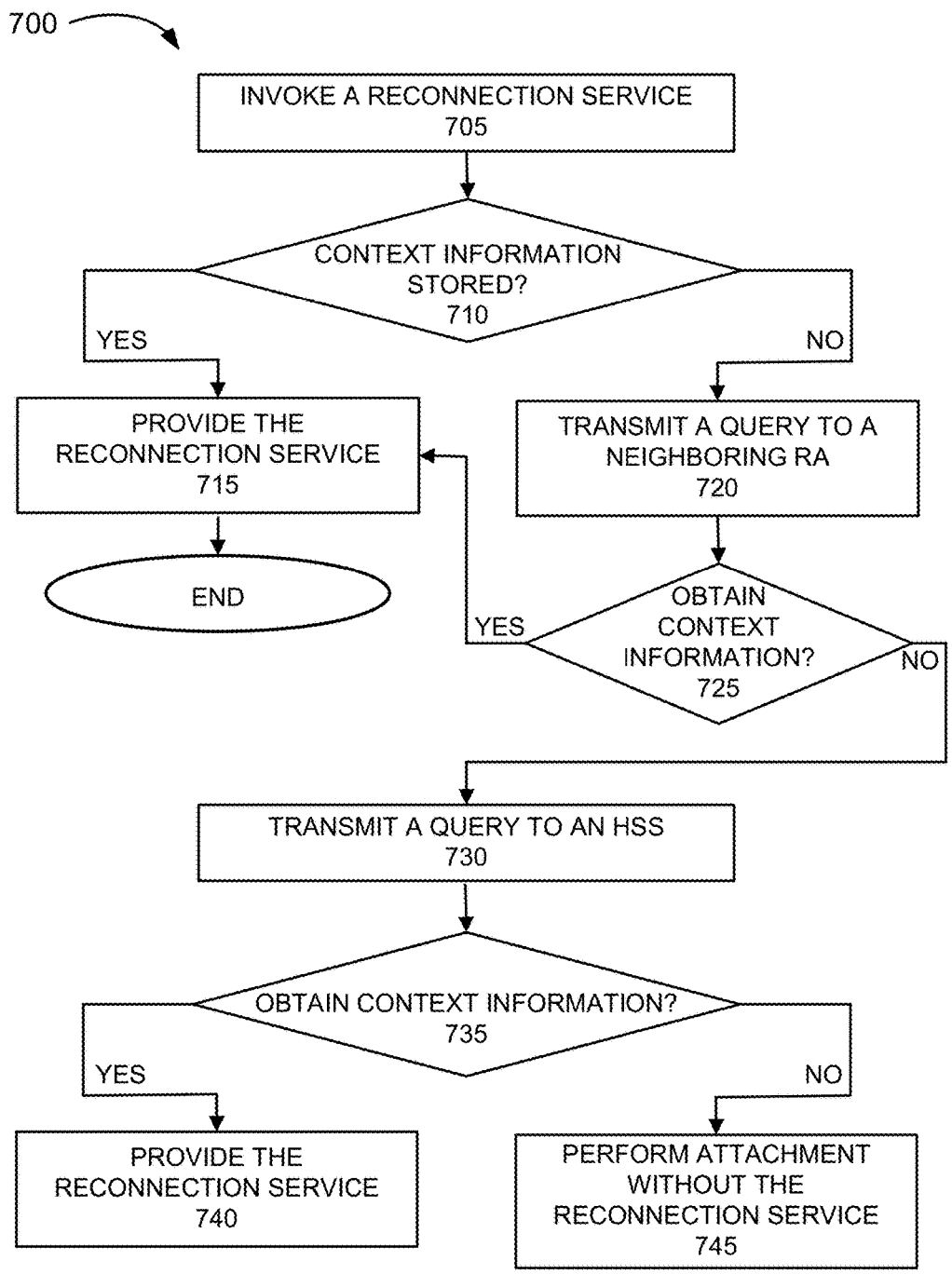
FIG. 7 is a flow diagram illustrating an exemplary process of an exemplary embodiment of the reconnection service.

FIG. 7 is a flow diagram illustrating an exemplary process 700 of an exemplary embodiment of the reconnection service. Process 700 is directed to a process previously described with respect to FIGS. 5A-5D, as well as elsewhere in this description, in which context information is obtained. According to an exemplary embodiment, reconnection agent 227 performs steps of process 700. For example, processor 610 executes software 620 to perform the steps illustrated in FIG. 7, and described herein.

Referring to FIG. 7, block 705 of process 700, a reconnection service may be invoked. Depending on an attachment procedure associated with a network (e.g., core network 110) and end device 160, the reconnection service may be invoked based on some other triggering event (e.g., an establishment of a connection, the obtainment of information used by the network to carry out the attachment on behalf of end device 160, the receipt of a message, the completion of an operation included in an attachment procedure etc.). Additionally, the reconnection service may be invoked at various stages during the attachment procedure, as described herein. According to an exemplary implementation, reconnection agent 227 may invoke the reconnection service in response to the completion of an ECM setup between MME 225 and end device 160.

In block 710, it is determined whether context information is stored. For example, reconnection agent 227 determines whether context information, which pertains to end device 160, is stored in storer 255. According to an exemplary implementation, reconnection agent 227 uses an end device identifier that identifies end device 160 to make such a determination.

When it is determined that the context information is stored (block 710—YES), the reconnection service is provided (block 715). For example, when reconnection agent 227 determines that the context information is stored in storer 255, reconnection agent 227 may provide the reconnection service in relation to one or multiple aspects of the attachment procedure for end device 160. According to an exemplary implementation, the reconnection service may be provided in relation to authentication, the obtainment of subscription data pertaining to end device 160, the obtainment of policy and charging information and the creation of a bearer.

When it is determined that the context information is not stored (block 710—NO), a query to a neighboring reconnection agent may be transmitted (block 720). For example, when reconnection agent 227 determines that the context information is not stored in storer 255, reconnection agent 227 may query a neighboring reconnection agent 227 for obtaining the context information of end device 160. By way of further example, reconnection agent 227 may generate and transmit a query request that includes the end device identifier of end device 160 and a request for the context information of end device 160.

In block 725, it is determined whether the context information is obtained. For example, reconnection agent 227 may determine whether the context information is obtained based on a query response obtained from neighboring reconnection agent 227.

When it is determined that the context information is obtained (block 725—YES), the reconnection service is provided (block 715). For example, when the query response includes the context information, reconnection agent 227 may provide the reconnection service in relation to one or multiple aspects of the attachment procedure for end device 160.

When it is determined that the context information is not obtained (block 725—NO), a query to an HSS may be transmitted (block 730). For example, when the query response does not include the context information, reconnection agent 227 may query HSS 230 for the context information. By way of further example, reconnection agent 227 may generate and transmit a query request that includes the end device identifier of end device 160 and a request for the context information of end device 160.

In block 735, it is determined whether the context information is obtained. For example, reconnection agent 227 may determine whether the context information is obtained based on a query response obtained from HSS 230.

When it is determined that the context information is obtained (block 735—YES), the reconnection service is provided (block 740). For example, when the query response includes the context information, reconnection agent 227 may provide the reconnection service in relation to one or multiple aspects of the attachment procedure for end device 160.

When it is determined that the context information is not obtained (block 735—NO), an attachment procedure may be performed without the reconnection service (block 745). For example, when the query response does not include the context information, reconnection service may be deactivated for end device 160, and the attachment procedure may proceed without the reconnection service.

Although FIG. 7 illustrates an exemplary process 700 of the reconnection service, according to other embodiments, process 700 may include additional operations, fewer operations, and/or different operations than those illustrated in FIG. 7, and described herein.

Figure 8A:
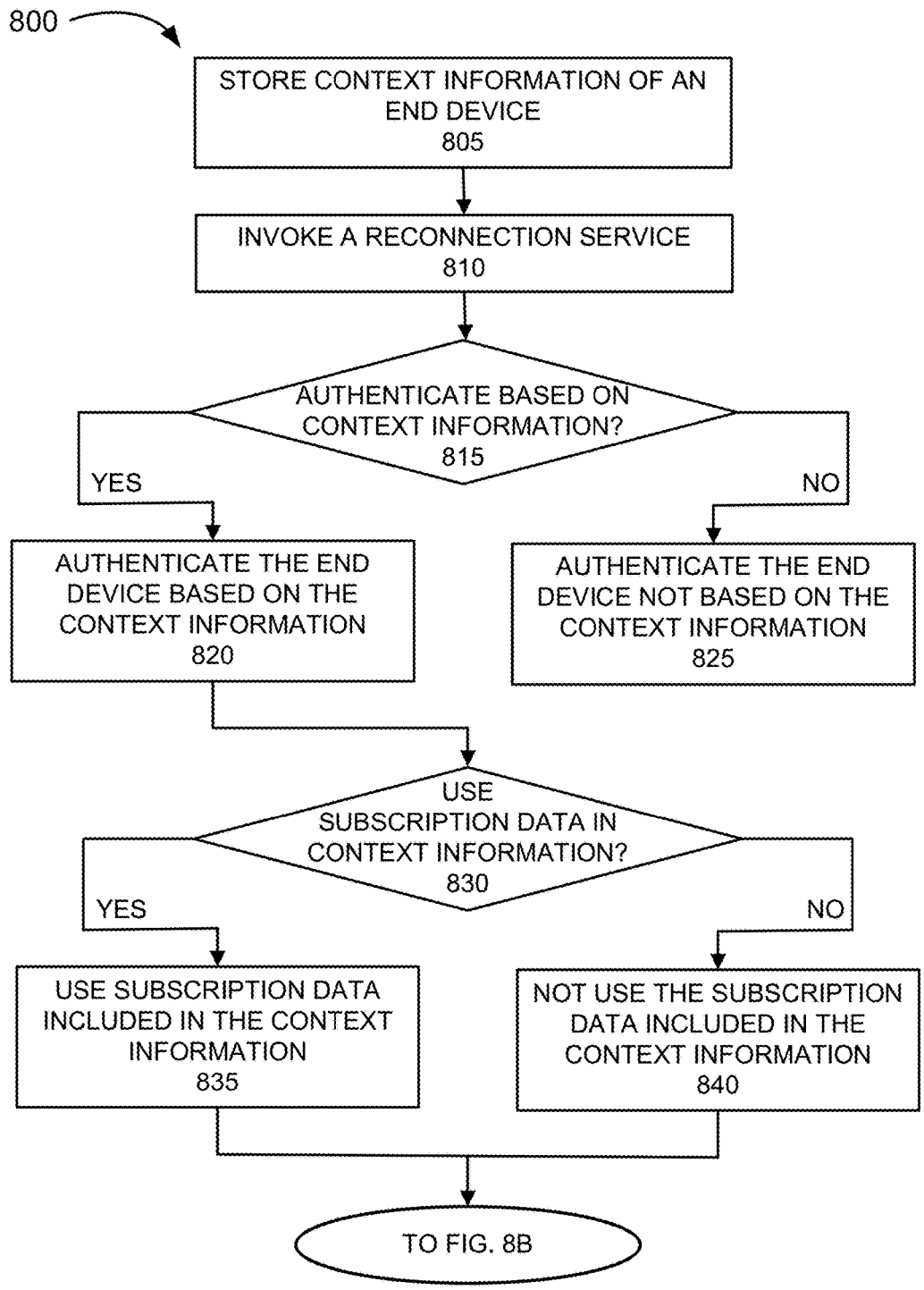
FIGS. 8A and 8B are flow diagrams illustrating another exemplary process of an exemplary embodiment of the reconnection service.
Figure 8B:
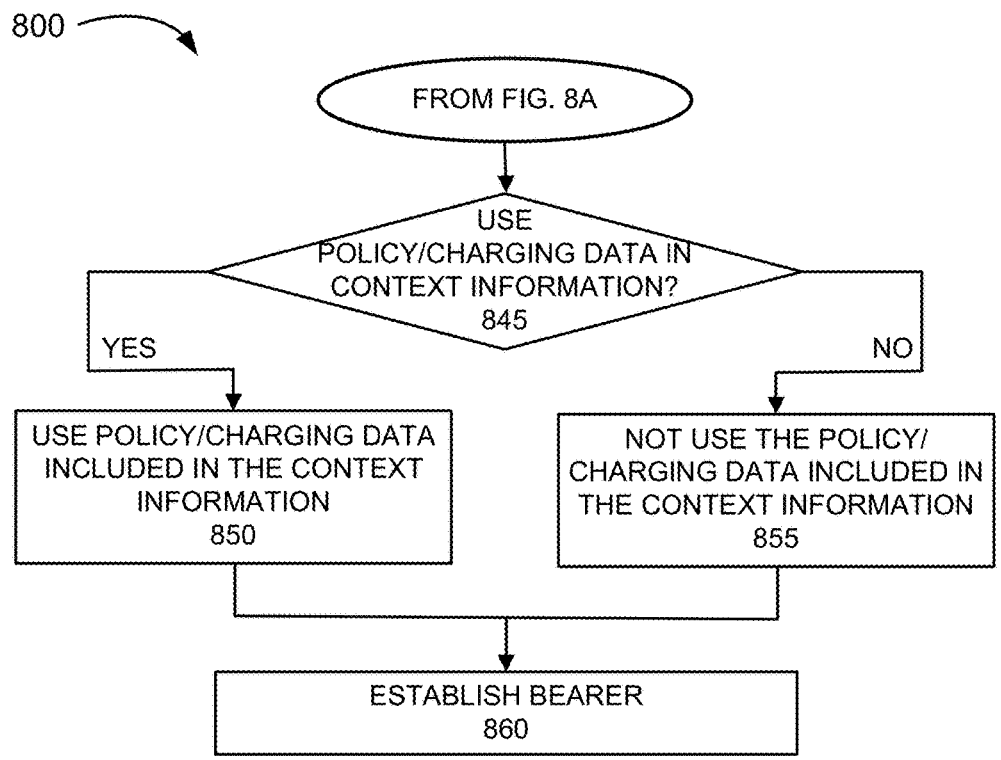

FIGS. 8A and 8B are flow diagrams illustrating an exemplary process 800 pertaining to the connection service. Process 800 is directed to a process previously described with respect to FIGS. 4A-4E, as well as elsewhere in this description, in which a reconnection service is provided. According to an exemplary embodiment, reconnection agent 227 performs steps of process 800. For example, processor 610 executes software 620 to perform the steps illustrated in FIGS. 8A and 8B, and described herein.

According to various exemplary embodiments of the reconnection service, different stages of an attachment procedure may or may not include the use of the reconnection service. According to an exemplary implementation, the use of the reconnection service during a particular stage of the attachment procedure may depend on the age of the context information and/or the type of context information being used. For example, the use of the GUTI of end device 160 versus the use of policy and charging data may be determining factor based on the difference in type of data and/or the age of the data in view of the type of data. According to another exemplary implementation, the use of the reconnection service during a particular stage of the attachment procedure may depend on the subscription of end device 160. For example, a service provider may offer different tiers of the reconnection service that in turn, may include the use or non-use of the reconnection service during various stages of the attachment procedure. According to yet other exemplary implementations, the use of the reconnection service during a particular stage of the attachment procedure may depend on other network configurable parameters (e.g., congestion level in the network, locale of attachment by end device 160, time of day of attachment, etc.).

According to an exemplary embodiment, as illustrated in FIGS. 8A and 8B, process 800 may include decisions blocks (e.g., block 815, block 830, and block 845) pertaining to the use of the context information. However, according to other exemplary embodiments, the reconnection service may omit the decision blocks and use the reconnection service during various stages of the attachment procedure. According to this example described below, process 800 is described in view of the former.

Referring to FIG. 8A, block 805 of process 800, context information of an end device is stored. For example, storer 255 of reconnection agent 227 stores context information pertaining to end device 160.

In block 810, a reconnection service is invoked. Depending on an attachment procedure associated with a network (e.g., core network 110) and end device 160, the reconnection service may be invoked based on some other triggering event (e.g., an establishment of a connection, the obtainment of information used by the network to carry out the attachment on behalf of end device 160, the receipt of a message, the completion of an operation included in an attachment procedure etc.). Additionally, the reconnection service may be invoked at various stages during the attachment procedure, as described herein.

In block 815, it is determined whether to authenticate the end device based on the context information. For example, reconnection agent 227 may determine whether to use the context information based on the type of data, the age of the data, the tier of subscription, and/or other network configurable parameter.

When it is determined to authenticate based on the context information (block 815—YES), the end device is authenticated based on the context information (block 820). For example, reconnection agent 227 may authenticate end device 160 based on the GUTI included in the context information.

When it is determined to not authenticate based on the context information (block 815—NO), the end device is not authenticated based on the context information (block 825).

For example, an authentication process may be performed that involves HSS 230 and end device 160, as previously described.

In block 830, it is determined whether to use the subscription data included in the context information. For example, reconnection agent 227 may determine whether to use the context information based on the type of data, the age of the data, the tier of subscription, and/or other network configurable parameter.

When it is determined to use the subscription data included in the context information (block 830—YES), the subscription data included in the context information is used (block 835). For example, the subscription data included in the context information is used during the attachment procedure. By way of further example, the subscription data is used to govern the creation of a bearer between the network and end device 160.

When it is determined to not use the subscription data included in the context information (block 830—NO), the subscription data included in the context information is not used (block 840). For example, subscription data of end device 160 is obtained from HSS 230, and used during the attachment procedure. By way of further example, the subscription data is used to govern the creation of a bearer between the network and end device 160.

Referring to FIG. 8B, in block 845, it is determined whether to use the policy and charging data included in the context information. For example, reconnection agent 227 may determine whether to use the context information based on the type of data, the age of the data, the tier of subscription, and/or other network configurable parameter.

When it is determined to use the policy and charging data included in the context information (block 845—YES), the policy and charging data included in the context information is used (block 850). For example, the policy and charging data included in the context information is used during the attachment procedure. By way of further example, the policy and charging data is used to govern the creation of a bearer between the network and end device 160.

When it is determined to not use the policy and charging data included in the context information (block 845—NO), the policy and charging data included in the context information is not used (block 855). For example, policy and charging data of end device 160 is obtained from PCRF 235, and used during the attachment procedure. By way of further example, the policy and charging data is used to govern the creation of a bearer between the network and end device 160.

In block 860, a bearer is established. For example, a bearer connection between the network and end device 160 is established and the attachment procedure is completed.

Although FIGS. 8A and 8B illustrate an exemplary process 800 of the reconnection service, according to other embodiments, process 800 may include additional operations, fewer operations, and/or different operations than those illustrated in FIGS. 8A and 8B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7, 8A, and 8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 610) of a computational device. A non-transitory storage medium includes one or more of the storage mediums described in relation to memory/storage 615.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   storing, by a network device of a network, context information pertaining to an end device and previous attachments to and detachments from the network by the end device, wherein the context information includes a unique identifier of the end device, subscription data, and policy and charging control data of the end device;
   receiving, by the network device, an indication that the end device requests an attachment to the network subsequent to the storing and subsequent to the previous attachments and detachments of the end device;
   determining, by the network device, to use the context information based on an age of the context information, a tier of subscription of the end device, and a congestion level in the network;
   authenticating, by the network device during the attachment in response to determining to use the context information, the end device using the context information; and
   causing, by the network device during the attachment, a creation of a bearer connection between the end device and the network using the context information.

2. The method of claim 1, wherein the unique identifier of the end device includes a globally unique temporary identifier assigned to the end device during one of the previous attachments, and wherein the authenticating comprises:
   authenticating, by the network, the end device using the globally unique temporary identifier.

3. The method of claim 1, wherein the causing further comprises:
   causing, by the network device, the creation of the bearer connection between the end device and the network using the subscription data and the policy and charging control data.

4. The method of claim 3, wherein the causing further comprises:
   transmitting, by the network device to a serving gateway of the network, a create session request that carries the subscription data and the policy and charging control data.

5. The method of claim 1, wherein the indication includes a completion of an Evolved Packet System Connection Management (ECM) setup between the end device and a mobility management entity of the network.

6. The method of claim 1, further comprising:
   generating, by the network, the context information based on historical data pertaining to the end device and previous attachments to and detachments from the network by the end device.

7. The method of claim 1, wherein the network includes a Long Term Evolution network or a Long Term Evolution Advanced network.

8. The method of claim 1, further comprising:
   generating the context information based on historical data pertaining to the previous attachments to and detachments from the network by the end device.

9. A network device comprising:
   a communication interface;
   a memory, wherein the memory stores instructions; and
   a processor, wherein the processor executes the instructions to:
      store context information pertaining to an end device and previous attachments to and detachments from the network by the end device, wherein the context information includes a unique identifier of the end device, subscription data, and policy and charging control data of the end device;
      receive an indication that the end device requests an attachment to the network subsequent to the storage of the context information and subsequent to the previous attachments and detachments of the end device;
      determine to use the context information based on an age of the context information, a tier of subscription of the end device, and a congestion level in the network;
      authenticate, during the attachment in response to a determination to use the context information, the end device using the context information; and
      cause, via the communication interface, during the attachment, a creation of a bearer connection between the end device and the network using the context information.

10. The network device of claim 9, wherein the unique identifier of the end device includes a globally unique temporary identifier assigned to the end device during one of the previous attachments, and wherein when the end device is authenticated, the processor further executes the instructions to:
    authenticate the end device using the globally unique temporary identifier.

11. The network device of claim 9, wherein when the creation of the bearer connection is caused, the processor further executes the instructions to:
    cause the creation of the bearer connection between the end device and the network using the subscription data and the policy and charging control data.

12. The network device of claim 11, wherein when the creation of the bearer connection is caused, the processor further executes the instructions to:
    transmit, via the communication interface to a serving gateway of the network, a create session request that carries the subscription data and the policy and charging control data.

13. The network device of claim 9, wherein the indication includes a completion of an Evolved Packet System Connection Management (ECM) setup between the end device and a mobility management entity of the network.

14. The network device of claim 9, wherein the processor further executes the instructions to:
    generate the context information based on historical data pertaining to the end device and previous attachments to and detachments from the network by the end device.

15. The network device of claim 9, wherein the processor further executes the instructions to:
    synchronize and update, via the communication interface, the context information with a home subscriber server.

16. A non-transitory computer-readable storage medium storing instructions executable by a processor of a device of a network, which when executed cause the device to:

store context information pertaining to an end device and previous attachments to and detachments from the network by the end device, wherein the context information includes a unique identifier of the end device, subscription data, and policy and charging control data of the end device;

receive an indication that the end device requests an attachment to the network subsequent to the storage of the context information and subsequent to the previous attachments and detachments of the end device;

determine to use the context information based on an age of the context information, a tier of subscription of the end device, and a congestion level in the network;

authenticate, during the attachment in response to a determination to use the context information, the end device using the context information; and cause, during the attachment, a creation of a bearer connection between the end device and the network using the context information.

17. The non-transitory computer-readable storage medium of claim 16, wherein the unique identifier of the end device includes a globally unique temporary identifier assigned to the end device during one of the previous attachments, and wherein the instructions to authenticate further store instructions executable by the processor of the device, which when executed cause the device to:

authenticate the end device using the globally unique temporary identifier.

18. The non-transitory computer-readable storage medium of claim 17, wherein the instructions to cause further store instructions executable by the processor of the device, which when executed cause the device to:

cause the creation of the bearer connection between the end device and the network using the subscription data and the policy and charging control data.

19. The non-transitory computer-readable storage medium of claim 16 wherein the indication includes a completion of an Evolved Packet System Connection Management (ECM) setup between the end device and a mobility management entity of the network.

20. The non-transitory computer-readable storage medium of claim 16 further storing instructions executable by the processor of the device, which when executed cause the device to:

generate the context information based on historical data pertaining to the end device and previous attachments to and detachments from the network by the end device.

* * * * *